United States Patent [19]

Carlsson

[11] Patent Number: 5,348,415
[45] Date of Patent: Sep. 20, 1994

[54] LOCKING DEVICE

[75] Inventor: Dicky Carlsson, Norrahammar, Sweden

[73] Assignee: Ergonomiprodukter I Bodafors AB, Nassjo, Sweden

[21] Appl. No.: 39,157

[22] Filed: Apr. 7, 1993

[30] Foreign Application Priority Data

Aug. 17, 1990 [SE] Sweden .................... 9002678-2

[51] Int. Cl.⁵ ...................... B25G 3/20; F16B 7/10
[52] U.S. Cl. ...................... 403/374; 403/109; 403/320; 403/350
[58] Field of Search ........... 403/320, 352, 350, 351, 403/373, 374, 376, 377, 109

[56] References Cited

U.S. PATENT DOCUMENTS

| 2,653,839 | 9/1953 | Middendorf | 403/374 |
| 3,603,623 | 9/1971 | Widman | 403/373 |
| 3,913,192 | 10/1975 | Baumer et al. | 403/377 |
| 4,029,279 | 6/1977 | Nakatani | 403/109 |
| 4,236,609 | 12/1980 | Carlsson | 403/109 |
| 4,596,484 | 6/1986 | Nakatani | 403/377 |
| 4,725,160 | 2/1988 | Wood | 403/374 |
| 4,761,092 | 8/1988 | Nakatani | 403/109 |
| 5,154,449 | 10/1992 | Suei-Long | 403/109 |

FOREIGN PATENT DOCUMENTS

| 0033072 | 8/1981 | European Pat. Off. | 403/374 |
| 0094520 | 11/1983 | European Pat. Off. | 403/377 |
| 0337518 | 10/1989 | European Pat. Off. | |
| 808978 | 7/1951 | Fed. Rep. of Germany | |
| 2516452 | 10/1976 | Fed. Rep. of Germany | |
| 3628911 | 3/1988 | Fed. Rep. of Germany | 403/352 |
| 156233 | 5/1987 | Norway | |
| 2067651 | 7/1981 | United Kingdom | 403/351 |
| 2129043 | 5/1984 | United Kingdom | 403/374 |

Primary Examiner—Richard A. Bertsch
Assistant Examiner—Howard R. Richman
Attorney, Agent, or Firm—Brooks & Kushman

[57] ABSTRACT

A device for releasably locking, in a tubular first member (1), a second member (2) which is displaceable in the first member, has a slide (6) mounted on the first member. A driver pin (7) on the second member <2) extends through a slot (4) in the first member and through a hole in the slide to entrain the slide in the displacement of the second member. A spring (9) urges an operazing lever (8) rotatably mounted on the driver pin (7), towards the slide (6). The slide has cam means (10) cooperating in such a manner with the operating lever (8) that this lever, when being rotated from a free position to a locking position, is urged out from the slide against the action of the spring (9), such that the spring urges the driver pin (7) outwardly so as to resiliently urge the second member (2) against the first member (1) which is thus clamped between the slide (6) and the second member (2), whereby to lock the latter in its position of displacement.

3 Claims, 1 Drawing Sheet

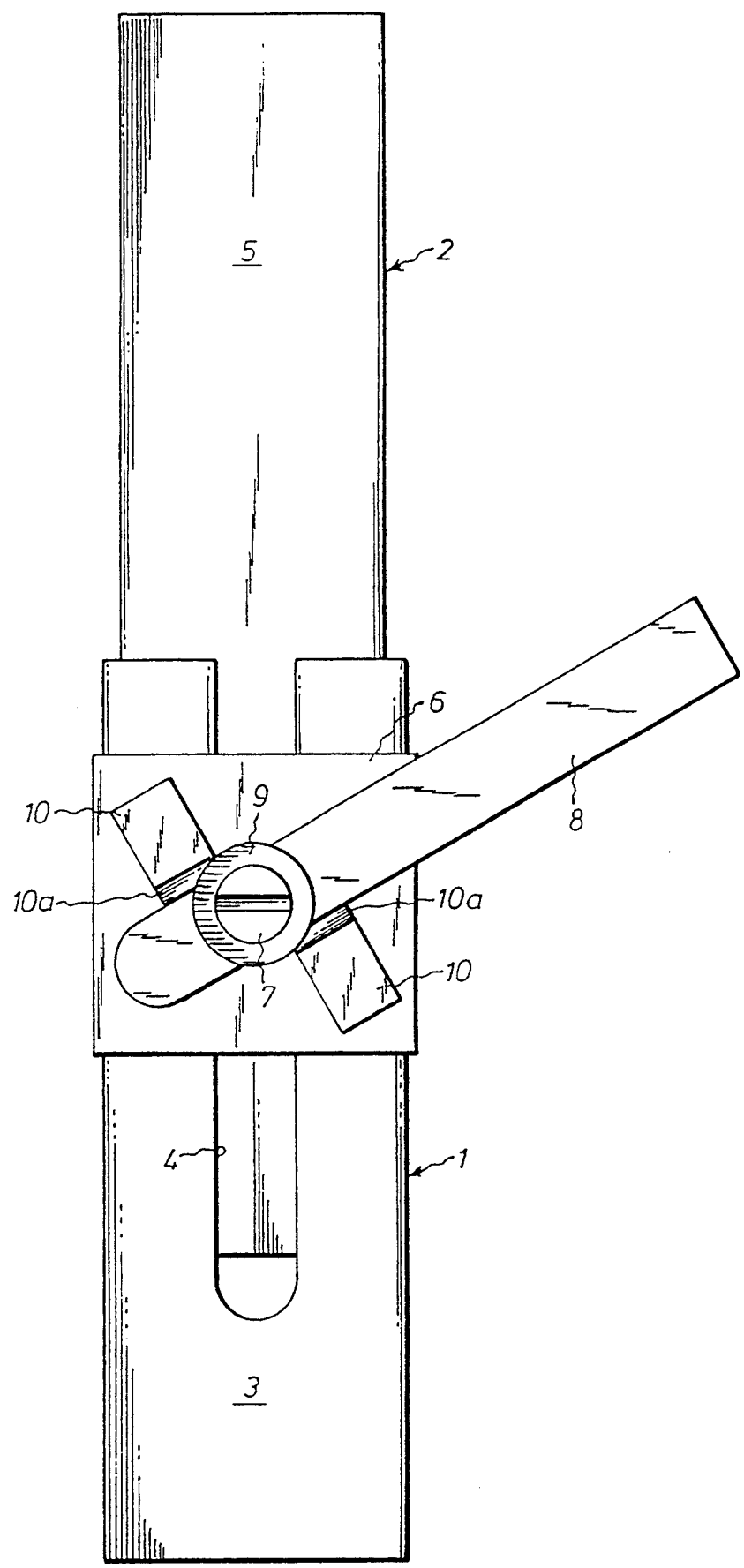

LOCKING DEVICE

The present invention relates to a device for releasably locking, in an arbitrary position of displacement in a tubular first member, a second member which is displaceable in the longitudinal direction of the first member.

Prior-art locking devices of this type are used in office chairs, in which the mutually displaceable members are included in a back-rest structure. The tubular first member is fixedly mounted on the chair in a substantially vertical position, while the second member supports a back-rest and is displaceable in the longitudinal direction of the tubular first member for vertical adjustment of the back-rest. In a known construction, the second member is locked in the desired vertical position by a locking pin which extends through a hole in the tubular first member and is insertable in an optional hole of a series of holes in the second member. Thus, the back-rest can be vertically adjusted only by steps, corresponding to the distance between the holes in the second member. In another known construction, use is made of an eccentric mechanism mounted on the tubular first member. The eccentric mechanism has an eccentric which via a slot in the tubular first member can be brought into engagement with the second member displaceable therein, to lock this second member in the desired position of displacement. Hence, the eccentric mechanism permits infinitely variable adjustment of the back-rest, but is disadvantageous in that the eccentric and/or the second member soon becomes worn out, with impaired locking reliability as a result.

The object of the present invention therefore is to provide a locking device which is designed especially for a back-rest structure in an office chair, and which permits infinitely variable adjustment of the position of displacement of the second member in relation to the tubular first member, and whose locking capacity is not impaired by possible wear of the locking elements included therein.

According to the present invention, this object is achieved by means of a device of the type described in the introduction to this specification, which is characterised by a slide mounted on said tubular first member and displaceable in the longitudinal direction thereof, a transverse driver pin connected to said second member and extending through a longitudinal slot in the tubular first member, and through a hole in the slide in order, upon displacement of the second member relative to the first member, to entrain the slide in said displacement, an operating level rotatably mounted on the driver pin outside the slide and adapted to be rotated between a free position, in which the second member is freely displaceable relative to the first member, and a locking position, in which the second member is locked in its position of displacement, and compression spring means mounted between said operating lever and an abutment formed on the driver pin, to urge the operating lever towards the slide which is provided with at least one cam means adapted to cooperate with the operating lever in a manner to urge said lever, when being rotated from its free position to its locking position, out from the slide against the action of said spring means, such that the spring means, via said abutment, urges the driver pin outwards, thus resiliently urging the second member against the tubular first member which is thereby clamped between the slide and the second member, thus locking the latter in its position of displacement.

The slide preferably has two substantially diametrically opposed cam means with respect to the driver pin.

Suitably, the driver pin is a bolt which is screwed in a threaded hole in the second member and whose head forms said abutment.

BRIEF DESCRIPTION OF THE DRAWING

The invention will now be described in more detail with reference to the accompanying drawing, showing an embodiment of a locking device according to the present invention.

DETAILED DESCRIPTION OF THE INVENTION

The drawing shows a tubular first member 1 which has rectangular cross-section and whose lower portion is fixed to an office chair (not shown), and a tubular second member 2 which also has rectangular cross-section and whose outer cross-sectional dimensions are substantially equal to the inner cross-sectional dimensions of the first member 1. The second member 2, whose upper portion supports a back-rest (not shown), is slidably mounted in the first member 1.

The first member 1 has in one 3 of its wider side walls a longitudinal, central slot 4 which extends a certain distance downwards from the upper end of the first member 1. The second member 2 has in one 5 of its wider side walls, namely the side wall 5 adjacent the side wall 3 of the first member, a threaded hole (not shown) located opposite the slot 4.

A slide 6, which is slidable along the first member, is mounted thereon. The slide 6 has a hole (not shown) located opposite the slot 4. A bolt 7 extending through the hole of the slide 6 and through the slot 4 is screwed in the threaded hole of the second member 2. The bolt 7 thus acts as a driver pin which, when the second member 2 is displaced along the first member 1, will entrain the slide 6 in this displacement.

An operating lever 8 is rotatably mounted on the bolt 7 outside the slide 6. The lever 8 is rotatable between a free position, which is shown in the drawing and in which the second member 2 is freely displaceable in relation to the first member 1, and a locking position, in which the second member 2 is locked in its position of displacement.

A compression spring means 9, consisting of a plurality of spring washers, is mounted between the operating lever 8 and the head of the bolt 7 for urging the lever towards the slide 6.

The slide 6 has two cam means 10 which are substantially diametrically opposed with respect to the bolt 7 and adapted to cooperate with the lever 8. When the lever 8 is turned clockwise in the drawing from its free position shown therein, in which the lever, as illustrated, extends between the two cam means 10, to its locking position, it is moved against the action of the compression spring means 9 up on to the cam means 10 via an oblique surface 10a formed on the respective cam means 10. The bolt 7 is then urged outwards, whereby the side wall 5 of the second member 2 is resiliently urged against the side wall 3 of the first member 1 or, in other words, the first member 1 is clamped between the slide 6 and the second member 2 which is thereby locked in its position of displacement.

To make it easier to move the operating lever 8 from its free position to its locking position, its underside is advantageously designed with bevelled side edges opposite the respective cam means 10.

A sound-damping liner of plastic (not shown) may be disposed between the slide 6 and the side wall 3 of the first member 1 to provide for a more silent displacement of the second member 2 and the slide 6 relative to the first member 1.

What is claimed is:

1. A device for releasably locking, in an arbitrary position of displacement in a tubular first member (1), a second member (2) which is displaceable in the longitudinal direction of said first member, characterized by a slide (6) mounted on said tubular first member (1) and displaceable in the longitudinal direction thereof, a transverse driver pin (7) connected to said second member (2) and extending through a longitudinal slot (4) in the tubular first member (1), and through a hole in the slide in order, upon displacement of the second member relative to the first member, to entrain the slide in said displacement, an operating lever (8) rotatably mounted on the driver pin (7) outside the slide (6) and adapted to be rotated between a free position, in which the second member (2) is freely displaceable relative to the first member (1), and a locking position, in which the second member is locked in its position of displacement, and compression spring means (9) mounted between said operating lever (8) and an abutment formed on the driver pin (7), to urge the operating lever towards the slide (6) which is provided with at least one cam means (10) adapted to cooperate with the operating lever (8) in a manner to urge this lever, when being rotated from its free position to its locking position, out from the slide (6) against the action of said spring means (9), such that the spring means, via said abutment, urges the driver pin (7) outwards, thus resiliently urging the second member (2) against the tubular first member which is thereby clamped between the slide (6) and the second member (2), thus locking the latter in its position of displacement.

2. A device as claimed in claim 1, characterized in that the slide (6) has two substantially diametrically opposed cam means (10) with respect to the driver pin (7).

3. A device as claimed in claim 1 or 2, characterized in that the driver pin (7) is a bolt which is screwed in a threaded hole in the second member (2) and whose head forms said abutment.

* * * * *